(12) United States Patent
Tanaka et al.

(10) Patent No.: US 10,165,238 B2
(45) Date of Patent: Dec. 25, 2018

(54) PROJECTOR SYSTEM

(71) Applicant: Panasonic Intellectual Property Management Co., Ltd., Osaka (JP)

(72) Inventors: Yasuhiro Tanaka, Hyogo (JP);
Yoshiyuki Hisatomi, Shiga (JP);
Kazuhiro Minami, Osaka (JP);
Kyoichi Miyazaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 32 days.

(21) Appl. No.: 15/009,362

(22) Filed: Jan. 28, 2016

(65) Prior Publication Data

US 2016/0150204 A1 May 26, 2016

Related U.S. Application Data

(63) Continuation of application No. PCT/JP2015/001152, filed on Mar. 4, 2015.

(30) Foreign Application Priority Data

Mar. 24, 2014 (JP) ................................. 2014-060642

(51) Int. Cl.
*H04N 9/31* (2006.01)
*G02B 7/16* (2006.01)
*G03B 21/14* (2006.01)

(52) U.S. Cl.
CPC ............. *H04N 9/3185* (2013.01); *G02B 7/16* (2013.01); *G03B 21/142* (2013.01);
(Continued)

(58) Field of Classification Search
CPC ... G02B 7/14; G02B 7/16; G02B 7/02; G02B 7/021; G02B 7/022; G02B 7/023;
(Continued)

(56) References Cited

U.S. PATENT DOCUMENTS 5,794,090 A 8/1998 Oshima et al.
6,587,159 B1 * 7/2003 Dewald .................... G02B 7/16
348/744

(Continued)

FOREIGN PATENT DOCUMENTS

JP H06-230279 A 8/1994
JP 10-115869 A 5/1998

(Continued)

OTHER PUBLICATIONS

International Search Report dated Apr. 21, 2015, issued in corresponding International Application No. PCT/JP2015/001152. (w/ English translation).

*Primary Examiner* — Christina Riddle
*Assistant Examiner* — Christopher Lamb, II
(74) *Attorney, Agent, or Firm* — McDermott Will & Emery LLP

(57) ABSTRACT

A projector system including a projector unit and a control device. The projector unit includes: a projector; a change mechanism that changes a projection direction; a plurality of optical systems having different optical properties; and a switch mechanism that selects one of the optical systems. The control device includes: a change unit that controls the change mechanism; and a switch unit that causes the switch mechanism to place one of the optical systems to be used for the projector in conjunction with the changing of the projection direction of the projector which is caused by the change unit.

6 Claims, 9 Drawing Sheets

(52) U.S. Cl.
CPC ......... *G03B 21/145* (2013.01); *G03B 21/147* (2013.01); *H04N 9/3147* (2013.01)

(58) Field of Classification Search
CPC ... G02B 7/04; G02B 7/08; G02B 7/09; G02B 7/10; G02B 7/102; G02B 7/105; G02B 15/00; G02B 15/02; G02B 15/04; G02B 15/06; G02B 15/08; G02B 15/10; G02B 15/12; G03B 21/142; G03B 21/147; G03B 21/14; H04N 9/3147; H04N 9/3185
See application file for complete search history.

(56) References Cited

U.S. PATENT DOCUMENTS

| | | | |
|---|---|---|---|
| 7,909,469 B2 | 3/2011 | Kobayashi et al. | |
| 8,330,876 B2 | 12/2012 | Morikuni | |
| 8,955,981 B2 | 2/2015 | Morikuni | |
| 9,128,365 B2 | 9/2015 | Morikuni | |
| 2006/0092338 A1 | 5/2006 | Sakai et al. | |
| 2006/0103811 A1* | 5/2006 | May | H04N 9/3185 353/69 |
| 2008/0062539 A1* | 3/2008 | Kato | G02B 7/16 359/813 |
| 2008/0284988 A1 | 11/2008 | Kobayashi et al. | |
| 2008/0297668 A1* | 12/2008 | Sawai | H04N 9/3185 348/744 |
| 2010/0208149 A1 | 8/2010 | Morikuni | |
| 2012/0218528 A1* | 8/2012 | Kano | G03B 21/142 353/101 |
| 2012/0249978 A1 | 10/2012 | Morikuni | |
| 2012/0249979 A1 | 10/2012 | Morikuni | |
| 2014/0016100 A1* | 1/2014 | Kim | G03B 37/04 353/30 |
| 2014/0111536 A1* | 4/2014 | Shinozaki | G09G 5/37 345/589 |

FOREIGN PATENT DOCUMENTS

| | | |
|---|---|---|
| JP | 2004-077545 A | 3/2004 |
| JP | 2006-133273 A | 5/2006 |
| JP | 2006-162726 A | 6/2006 |
| JP | 2007-316240 A | 12/2007 |
| JP | 2008-139530 A | 6/2008 |
| JP | 2008-287114 A | 11/2008 |
| JP | 2009-294349 A | 12/2009 |
| JP | 2010-186150 A | 8/2010 |
| JP | 2011-170008 A | 9/2011 |
| JP | 2012-247524 A | 12/2012 |

* cited by examiner

PROJECTOR SYSTEM

CROSS REFERENCE TO RELATED APPLICATIONS

This is a continuation application of PCT International Application No. PCT/JP2015/001152 filed on Mar. 4, 2015, designating the United States of America, which is based on and claims priority of Japanese Patent Application No. 2014-060642 filed on Mar. 24, 2014. The entire disclosures of the above-identified applications, including the specifications, drawings and claims are incorporated herein by reference in their entirety.

FIELD

The present disclosure relates to a projector system including a projector unit capable of changing a projection direction of light.

BACKGROUND

Conventional projectors can change the size of projected images. However, the aspect ratio of a maximum size for projected images is often fixed. In order to address this, for example, a technique, such as a projector unit, which is disclosed in Patent Literature (PTL) 1 below, which switches a plurality of optical systems to change the aspect ratio of a maximum size for images projected by a projector is provided.

CITATION LIST

Patent Literature

[PTL 1] Japanese Unexamined Patent Application Publication No. 2007-316240

SUMMARY

Technical Problem

The present disclosure provides a projector system including a projector unit that is capable of changing a projection direction of a projector to an arbitrary direction and that can prevent decrease in the number of effective pixels in a projected image even if the projected image has been distorted due to a change in an inclination of a projection target with respect to the projection direction and is corrected to be rectangular.

Solution to Problem

In order to solve the above problem, in accordance with an aspect of the present disclosure, there is provided a projector system including: a projector unit that projects light; and a control device that controls the projector unit, wherein the projector unit includes: a projector that projects the light; a change mechanism that changes a projection direction of the projector; a plurality of optical systems having different optical properties; and a switch mechanism that selects an optical system from the plurality of the optical systems and places the selected optical system at a position which the light projected from the projector passes through, and the control device includes: a change unit configured to control the change mechanism; and a switch unit configured to cause the switch mechanism to perform the placing of the selected optical system in conjunction with the changing of the projection direction of the projector which is caused by the change unit.

Advantageous Effects

The present disclosure is capable of changing a projection direction of a projector to a desired direction, and of maintaining a high ratio of the number of effective pixels to the total number of pixels in a projected image even if the projected image has been significantly distorted due to a change in an inclination of a projection target with respect to the projection direction and is therefore corrected to be rectangular in image processing.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DESCRIPTION OF EMBODIMENTS

Embodiment 1

Figure 1:
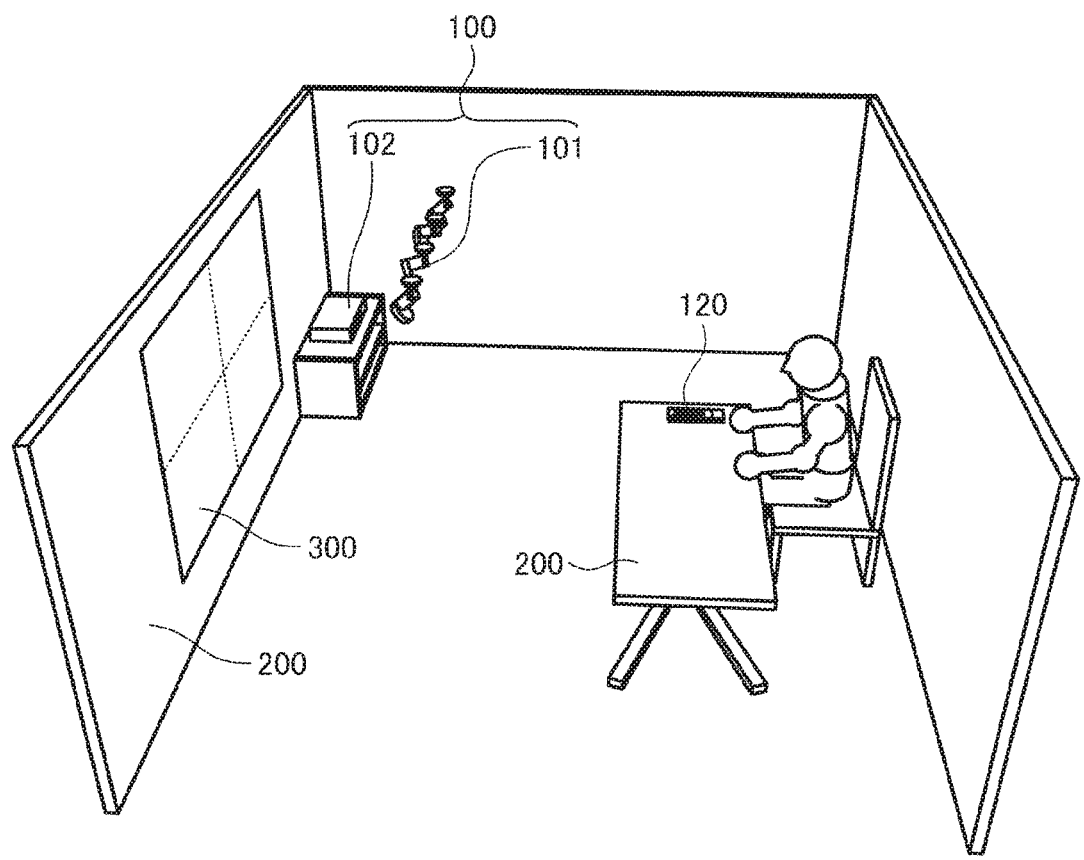
FIG. 1 is a schematic perspective view of a usage example of a projector system according to an embodiment.
Figure 2:
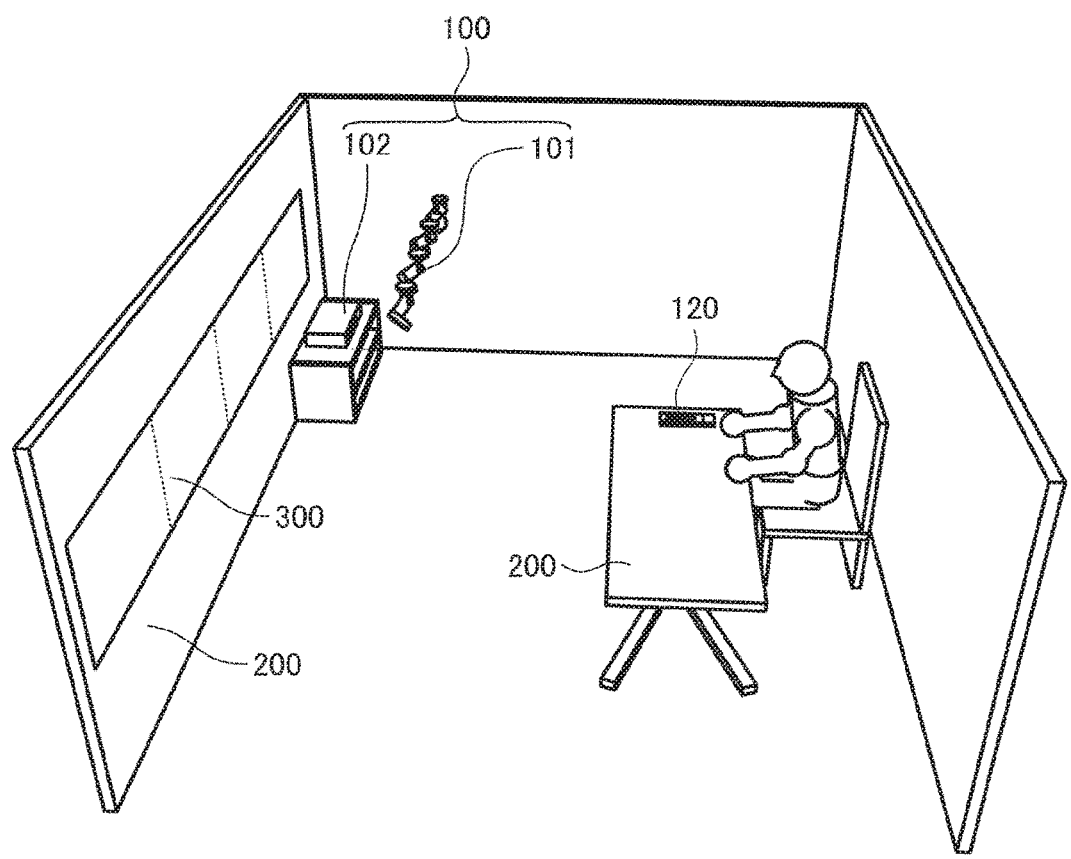
FIG. 2 is a schematic perspective view of another usage example of the projector system according to the embodiment.
Figure 3:
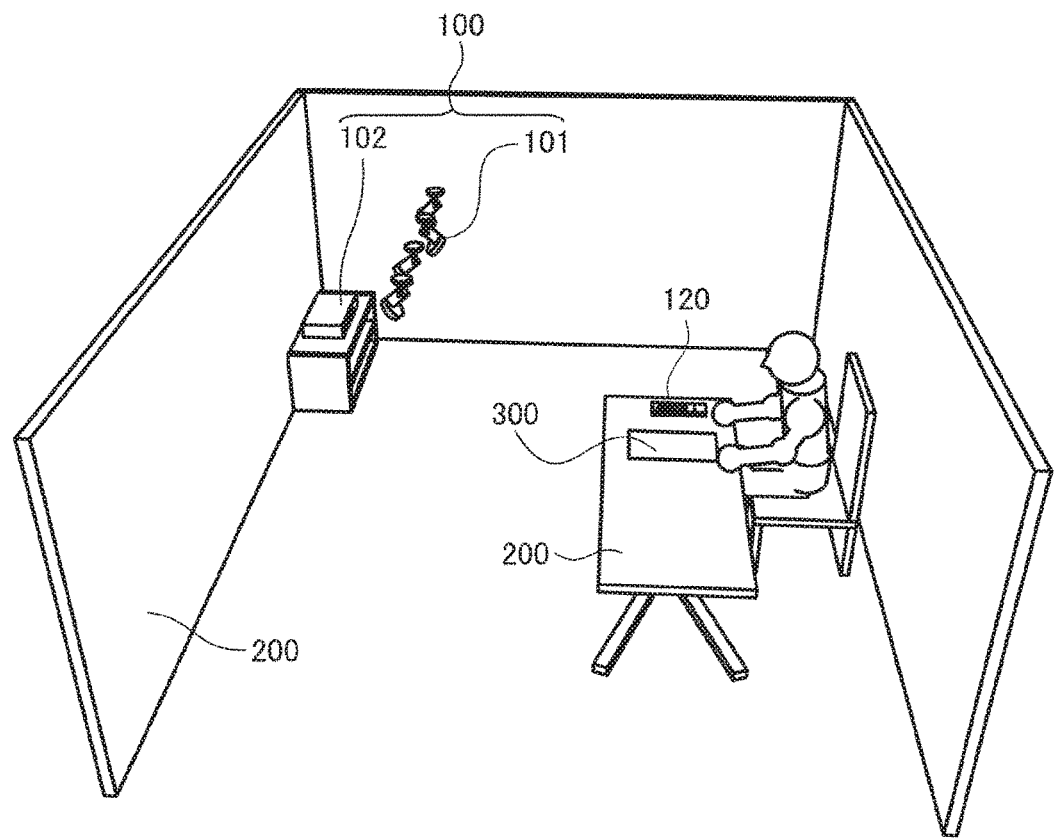
FIG. 3 is a schematic perspective view of still another usage example of the projector system according to the embodiment.

Recently, regarding projector systems, it has been proposed to display an image according to content or a usage of the image by changing a projection direction of a projector unit attached to a ceiling or the like. An example of FIG. 1 shows that a projected image having a common aspect ratio, such as 4:3 or 16:9, is displayed on a projection target, such as a wall. An example of FIG. 2 shows that a horizontally-long projected image having an aspect ratio, such as 21:9, is displayed. An example of FIG. 3 shows that an image is projected on a table in front of a user.

If a projection direction is changed to display an image on a desired projection target while the projector unit is fixed on the ceiling or the like as illustrated in the above figures, the projected image may be significantly distorted depending on the inclination of the projection target with respect to the projection direction. For a method of correcting such distortion, it is considered to offset the distortion by generating a reversely-distorted image in image processing. In this case, however, effective pixels in the image projection are reduced, and the image quality of the projected image is therefore deteriorated.

In order to solve such a problem, in accordance with an aspect of the present disclosure, there is provided a projector system including: a projector unit that projects light; and a control device that controls the projector unit, wherein the projector unit includes: a projector that projects the light; a change mechanism that changes a projection direction of the projector; a plurality of optical systems having different optical properties; and a switch mechanism that selects an optical system from the plurality of the optical systems and places the selected optical system at a position which the light projected from the projector passes through, and the control device includes: a change unit configured to control the change mechanism; and a switch unit configured to cause the switch mechanism to perform the placing of the selected optical system in conjunction with the changing of the projection direction of the projector which is caused by the change unit With this structure, it is possible to select an optical system capable of reducing the distortion caused by the inclination of the projection target as much as possible or an optical system capable of decreasing a degree of the distortion. As a result, the projector system can project a high-quality image while preventing decrease in effective pixels which is caused by image processing.

The following describes an embodiment in detail with reference to the accompanying drawings. However, unnecessarily detailed description is omitted in some cases. For example, detailed description of well-known matters and repeated description of substantially identical structures may be omitted. This is to avoid unnecessary redundancy in the following description to make those skilled in the art easily understand the description.

Furthermore, the inventors provide the accompanying drawings and the following description to enable those skilled in the art to more fully understand the present disclosure, and have no intention of restricting the subject manner of the claims to the drawings and the description.

Moreover, the respective figures are schematic diagrams and are not necessarily precise illustrations. In addition, in the respective diagrams, the same reference numerals are used throughout to designate the same constituent elements.

Embodiment

[1. Projector System]

FIG. 1 is a schematic perspective view of a usage example of a projector system according to a present embodiment.

FIG. 2 is a schematic perspective view of another usage example of the projector system according to the present embodiment.

FIG. 3 is a schematic perspective view of still another usage example of the projector system according to the present embodiment.

As illustrated in these figures, a projector system 100 according to the present embodiment includes at least one projector unit 101 and a control device 102. The projector unit 101 displays a projected image 300 on a projection target 200 by projecting light. The control device 102 controls the operations of the projector unit 101.

Examples of the projection target 200 include a screen, a white wall, a floor, and a table. The surface of the projection target 200 may be either flat or curved. Even on a single screen or a single wall, for example, there are different projection targets 200 depending on directions of projecting light (projection directions).

[1-1. Projector Unit]

Figure 4:
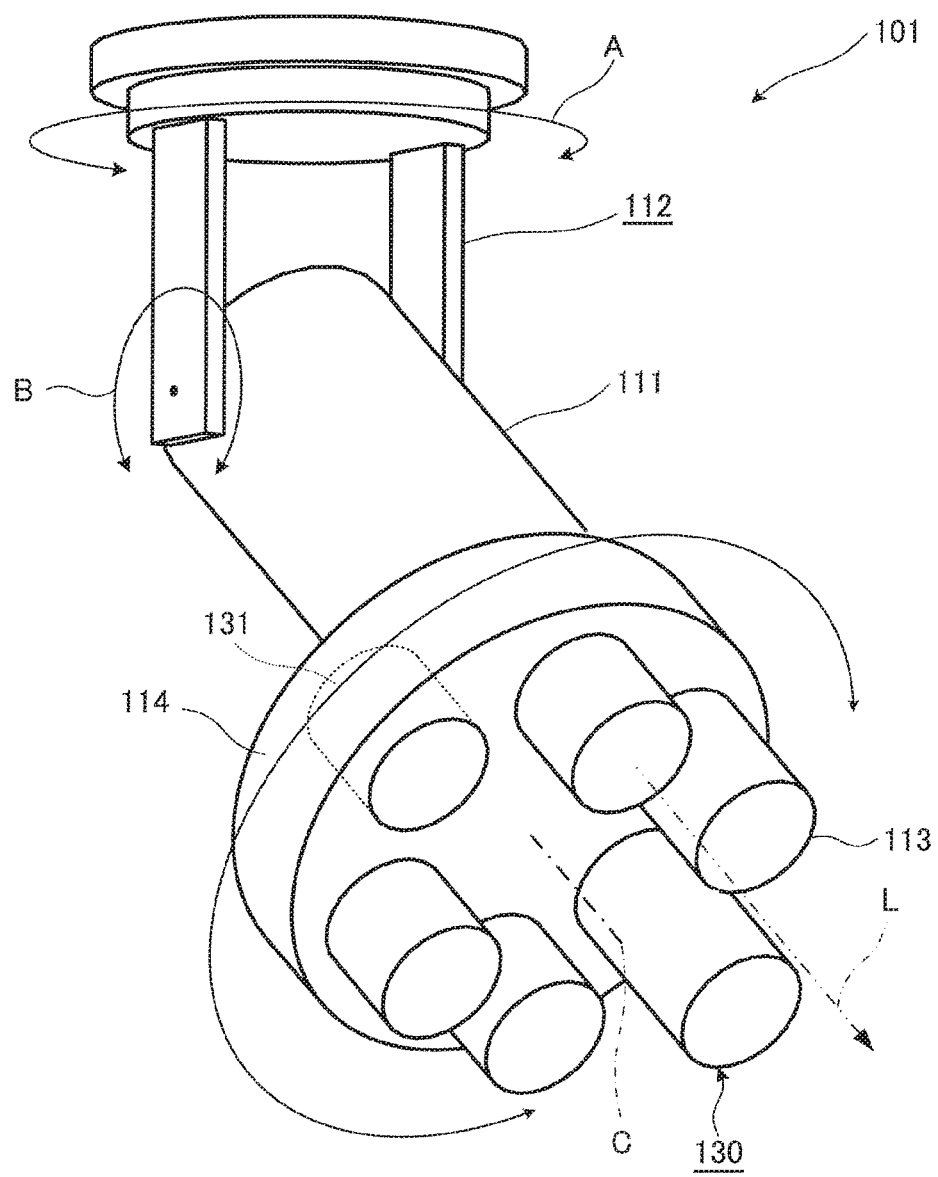
FIG. 4 is a perspective external view of a projector unit according to the embodiment.

FIG. 4 is a perspective external view of the projector unit 101.

As illustrated in FIG. 4, the projector unit 101 includes a projector 111, a change mechanism 112, optical systems 113, and a switch mechanism 114.

In the present embodiment, as illustrated in FIGS. 1 to 3, the projector unit 101 is a device attachable to a ceiling or the like. In these examples, the projector system 100 includes four projector units 101 arranged in a line on the ceiling.

[1-1-1. Projector]

The projector 111 is a device that projects light, and more specifically, a device that projects an image corresponding to received image signal onto the projection target 200, such as a wall surface or a table. It should be noted that the projector 111 may serve also as a lighting device or the like if the image signal is set to indicate white only or other colors.

An actual example of the projector 111 is a Digital Light Processing (DLP) projector. The DLP projector is a projector using a digital mirror device.

In the present embodiment, the projector 111 includes an optical system different from the optical systems 113 that are switchable. This optical system enables the projector 111 alone to project light.

[1-1-2. Change Mechanism]

The change mechanism 112 is a mechanism that changes a projection direction of the projector 111. More specifically, the change mechanism 112 is capable of changing a projection direction of the projector 111 based on signal received from the control device 102 and of maintaining the projection direction to be a predetermined direction. In the present embodiment, the change mechanism 112 is capable of rotating the projector 111 around both a vertical axis (A in FIG. 4) and a horizontal axis (B in FIG. 4). With this structure, the change mechanism 112 can change a projection direction of the projector 111 to any direction within a hemisphere face.

As described above, the change mechanism 112 enables the projector 111 to orient a projection direction towards the projection target 200 that is predetermined or previously-selected.

In the present embodiment, each of the four projector units 101 includes the change mechanism 112. The change mechanisms 112 in the four projector units 101 are capable of independently changing projection directions of the projectors 111.

Each of the change mechanisms 112 may also include an encoder and be capable of transmitting information indicating a projection direction of the projector 111 to the control device 102.

Each of the change mechanisms 112 may further include a mechanism of rotating the projector 111 around an optical axis (L in FIG. 4) of the projector 111.

This structure can change a distorting direction of a projected image.

[1-1-3. Optical System]

The optical system 113 is an optical member that changes a projection state of light projected from the projector 111. The optical system 113 is a combination of a plurality of lenses, a reflecting mirror, and the like. Each of the projector units 101 includes a plurality of such optical systems 113 capable of producing various projection states of different lights, in other words, the optical systems 113 having different optical properties. Here, the projection state of light (optical properties) refers to a distortion state, a size, an aspect ratio, and the like of a region on which light is projected (projection region), in the case where light is projected from the projector 111 onto the projection target 200.

An example of the optical system 113 capable of changing distortion of a projection region is a distortion-correcting optical system. Specific examples of the distortion-correcting optical system include an optical system for performing at least one of decentering and tilting of a refractive lens, and an optical system having a refracting surface including aspheric surfaces (not only a spherical surface). Furthermore, other examples of the distortion-correcting optical system include an optical system for performing at least one of decentering and tilting of a reflective lens, and an optical system having a reflective surface including aspheric surfaces.

Examples of the optical system 113 for changing a size of a projection region include a wide converter and a teleconverter.

Examples of the optical system 113 for changing an aspect ratio of a projection region include an optical system including a cylindrical lens and an optical system including an anamorphic lens.

According to the present embodiment, since the projector 111 includes the optical system for projecting light, each of the optical systems 113 changes a projection state of the light that has passed through the optical system included in the projector 111. The change mechanism 112 includes a tube 131 (see FIG. 4) that merely transmits light (in other words, does not change a projection state of light) to allow the projector 111 to project light using only the optical system included in the projector 111.

It should be noted that examples of the optical system 113 also include a filter, such as a color filter.

[1-1-4. Switch Mechanism]

The switch mechanism 114 is a mechanism that switches the plural kinds of optical systems 113 to select one of the optical systems 113 to be used for the projector 111. In the present embodiment, the switch mechanism 114 is a known turret-type switch mechanism capable of selectively placing one optical system 113, which is selected from an optical system group 130 including the plural kinds of optical systems 113, at a position which light projected from the projector 111 passes through, by rotating all the optical systems 113 arranged on the circumference around the center axis of the circumference (C in FIG. 4). More specifically, in the switch mechanism 114, an optical axis L of the projector 111 and the axis C around which the optical system group 130 rotates are arranged to have a positional relationship by which the optical axis L and the axis C are parallel to each other and separated by a distance, and the optical systems 113 having different optical properties are arranged on a circumference having a radius that is the distance between the optical axis L and the axis C.

It should be noted that the switch mechanism 114 is not limited to the above and may be any mechanism capable of selectively switching the optical systems 113. For example, it is possible to perform the switching by sliding, along the projector 111, the optical systems 113 arranged in a direct line.

[1-2. Control Device]

Figure 5:
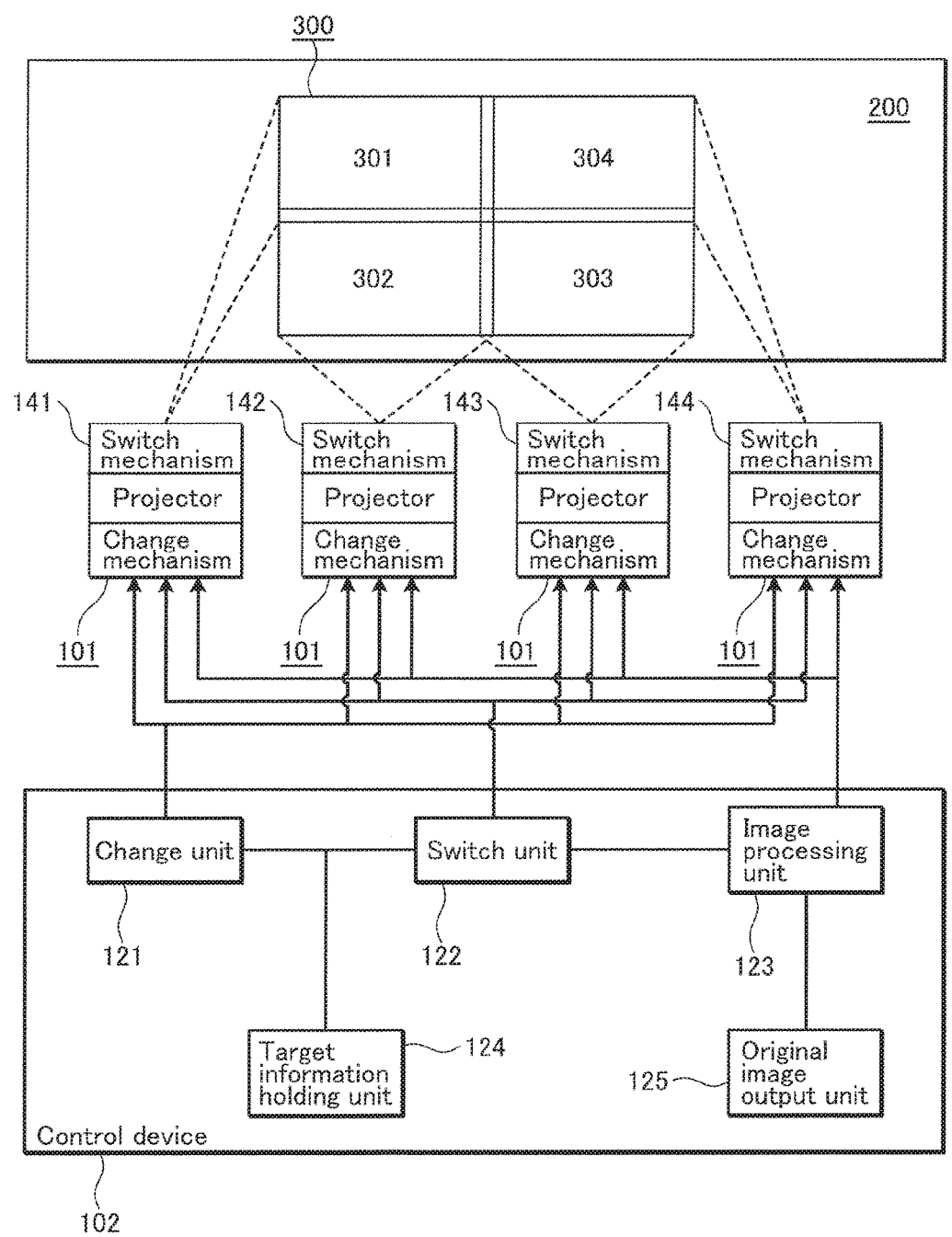
FIG. 5 is a block diagram illustrating both functional units of a control device and mechanical units of the projector unit according to the embodiment.

FIG. 5 is a block diagram illustrating both functional units of the control device and mechanical units in each of the projector units.

As illustrated in FIG. 5, the control device 102 is a device that controls operations of the projector units 101, and includes a change unit 121 and a switch unit 122. In the present embodiment, the control device 102 controls operations of the four projector units 101, and transmits image signals to the projectors 111. Therefore, the control device 102 also includes an image processing unit 123, a target information holding unit 124, and an original image output unit 125.

The control device 102 is, for example, a computer including a Central Processing Unit (CPU), a storage device, and the like, and reads computer program(s) (software) from the storage device and causes the CPU to execute the computer program(s) to realize the processing units.

It should be noted that the control device 102 may be berried in a wall surface or a ceiling, or may be embedded in one of the projector units 101 or in each of the projector units 101.

[1-2-1. Change Unit]

The change unit 121 is a processing unit that controls the change mechanisms 112 included in each of the projector units 101. In the present embodiment, the change unit 121 is capable of individually controlling the change mechanisms 112 included in the four projector units 101.

More specifically, for example, in the control device 102, target information holding unit 124 holds pieces of target information (for example, pieces of information indicating projection directions) for identifying a plurality of projection targets 200 around the projector units 101. When an operator selects one of the projection targets 200, the change unit 121 in the control device 102 controls the change mechanisms 112 based on the target information so that the projection direction is oriented towards the selected projection target 200.

For example, as illustrated in FIG. 3, if a selected projection target 200 is a table, the control device 102 controls only a projector unit 101 that is the most close to the projection target 200 among the projector units 101, and causes the change mechanism 112 in the controlled projector unit 101 to orient a projection direction of the projector 111 towards the table.

Furthermore, assuming that the plurality of projector units 101 include a first projector unit 141, a second projector unit 142, a third projector unit 143, and a fourth projector unit 144, the change unit 121 controls, based on the aspect ratio outputted from the original image output unit 125 or an operator's arbitrary instruction, the change mechanism 112 included in the first projector unit 141 and the change mechanism 112 included in the second projector unit 142, in order to selectively switch a positional relationship between (i) a first projected image 301 that is a projected image 300 projected by the first projector unit 141 and (ii) a second projected image 302 that is a projected image 300 projected by the second projector unit 142. The change unit 121 also controls the third projector unit 143 and the fourth projector unit 144 in the same manner as above to selectively switch a positional relationship between a third projected image 303 that is a projected image 300 projected by the third projector unit 143 and a fourth projected image 304 that is a projected image 300 projected by the fourth projector unit 144.

Here, the change unit 121 may control the change mechanisms 112 not to change a relative positional relationship between the second projected image 302 and the third projected image 303 which are adjacent projected images among the four or more projected images 300.

Examples of the positional relationship among the projected images 300 include an arrangement of the four projected images 300 in a matrix with two rows and two columns (normal arrangement) as illustrated in FIG. 1 and an arrangement of the four projected images 300 in a horizontal line (horizontally-long arrangement) as illustrated in FIG. 2. For example, the change unit 121 selects the normal arrangement if an image having an aspect ratio, such as 4:3 or 16:9, is to be outputted, while the change unit 121 selects the horizontally-long arrangement if an image having an aspect ratio, such as 21:9, is to be outputted.

[1-2-2. Switch Unit]

The switch unit 122 is a processing unit that causes the switch mechanism 114 to select one of the plural kinds of optical systems 113 in conjunction with changing of a projection direction of the projector 111 which is caused by the change unit 121.

More specifically, for example, when the operator selects one of the projection targets 200, the change unit change unit 121 causes the change mechanism 112 to orient a projection direction of the projector 111 towards the selected projection target 200. In conjunction with this, the switch unit 122 causes the switch mechanism 114 to place one of the optical systems 113 to be used for the projector 111 so that deterioration of image quality is decreased in a resulting projected image 300 projected on the selected projection target 200.

Here, within the scope of the present description and the claims, examples of the switching of the optical systems 113 which is performed in conjunction with changing of a projection direction include the following cases (i) and (ii).

(i) Signals (for example, signals each of which is generated by an encoder in the change mechanism 112 and indicates a projection direction of the projector 111) are obtained from the projector unit 101, and if there is a projection direction within a predetermined range, the switching of the optical systems 113 is performed.

(ii) Based on the target information indicating a projection target 200 or a projection direction, the change unit 121 controls the change mechanism 112, and at the same time, the switch unit 122 causes the switch mechanism 114 to switch the optical systems 113.

[1-2-3. Image Processing Unit]

The image processing unit 123 is a processing unit that performs image processing of correcting a distorted projected image to be rectangular based on a projection direction of the projector 111 and a selected optical system 113. More specifically, the image processing unit 123 performs correction processing similar to the known trapezoidal distortion correction, reversely distorting a rectangular image outputted from the original image output unit 125, depending on a projection direction of the projector 111 and a selected optical system 113, in consideration of distortion of a projection region displayed on the projection target 200.

Furthermore, if an original image is divided into pieces and respectively displayed by a plurality of the projector units 101, the image processing is performed based on a projection direction of the projector 111 and a selected optical system 113 in each of the projector units 101. It is also possible, as illustrated in FIG. 5, to perform image processing by which a plurality of projected images 300 are projected to partly overlap each other, so that a viewer hardly notices the boundaries between the projected images 300.

[1-2-4. Target Information Holding Unit]

The target information holding unit 124 is a processing unit that holds the pieces of target information for identifying a plurality of projection targets 200 around the projector units 101.

Here, the pieces of target information are, for example, pieces of information each of which indicates a projection direction. The pieces of target information may be information in which a state of distortion caused when a projector unit 101 projects light on a projection target 200 is associated with each of the optical systems 113 or each of the projector units 101.

It should be noted that each of the pieces of target information is not necessarily stored, but may be obtained using a three-dimensional (3D) sensor or the like each time the projection target 200 is changed. In this case, the target information holding unit 124 temporarily holds the target information in a short time.

[1-2-5. Original Image Output Unit]

The original image output unit 125 is a processing unit that outputs an original image signal indicating one image content. The original image output unit 125 is capable of, for example, obtaining the original image signal by broadcast waves or from a recording medium and outputting the original image signal.

[2. Processing of Projector System]

Next, the processing of the projector system 100 according to the present embodiment is described below.

Figure 6:
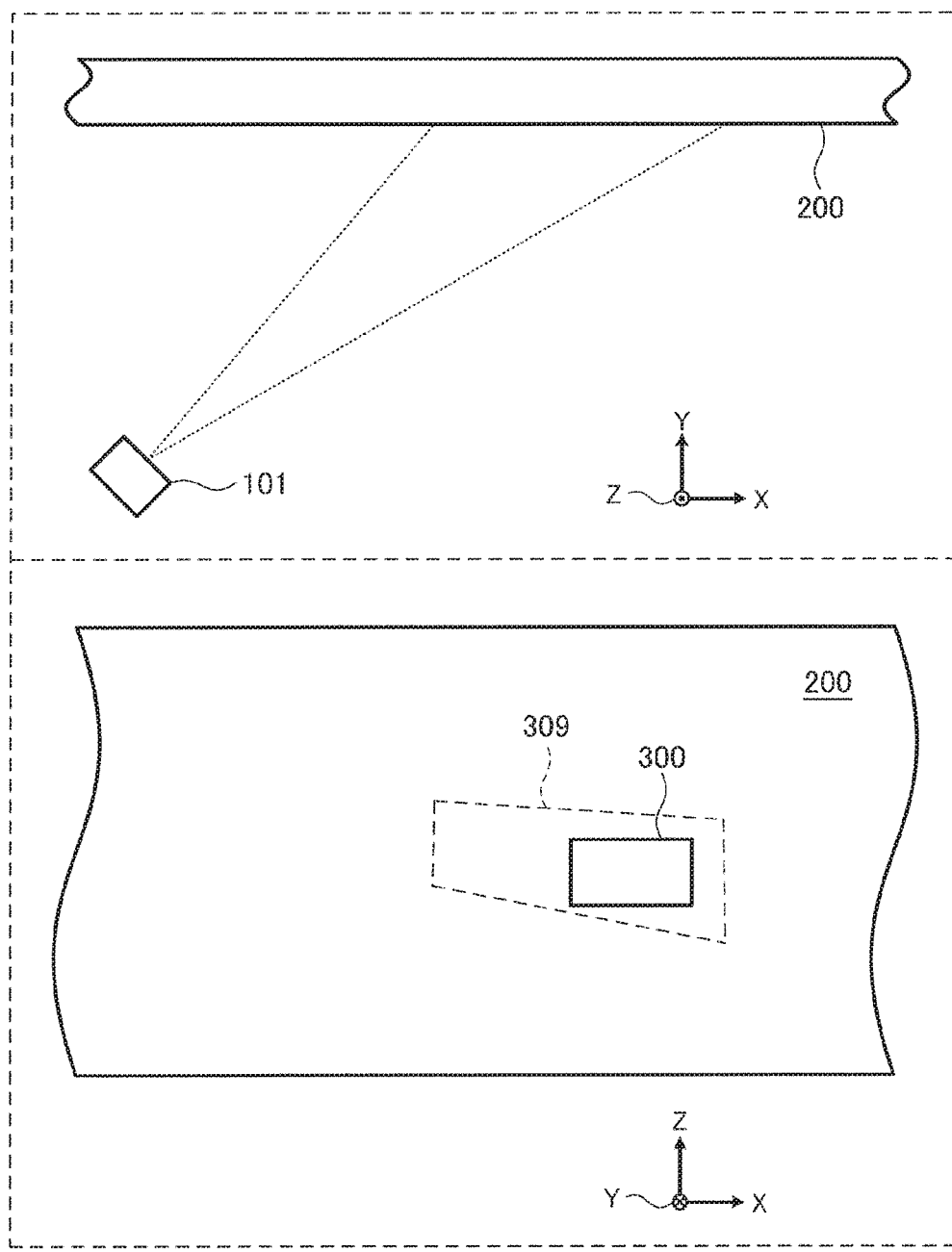
FIG. 6 illustrates a plan view and a side view of a projected image generated without using an optical system according to the embodiment.
Figure 7:
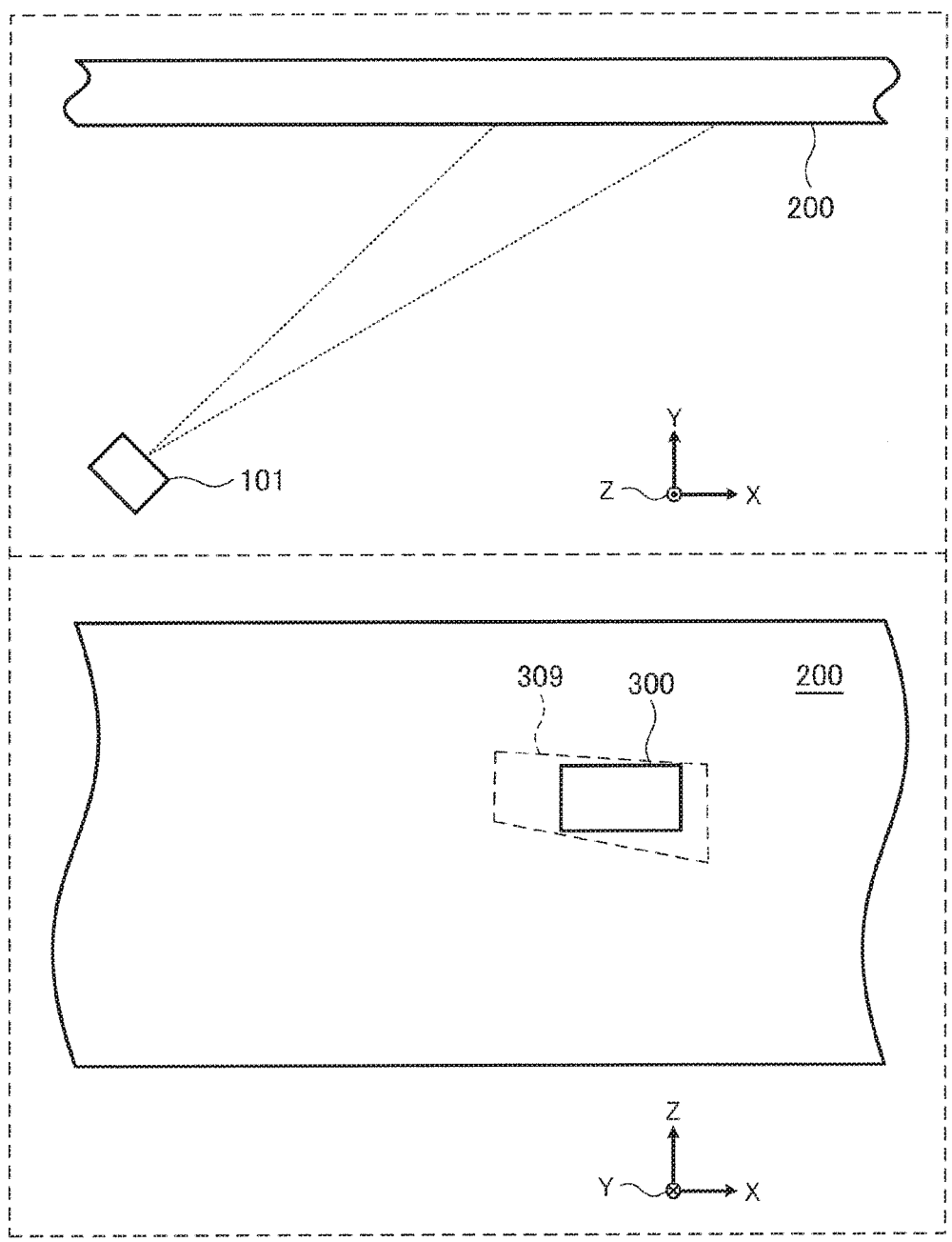
FIG. 7 illustrates a plan view and a side view of a projected image generated by using an optical system according to the embodiment.
Figure 8:
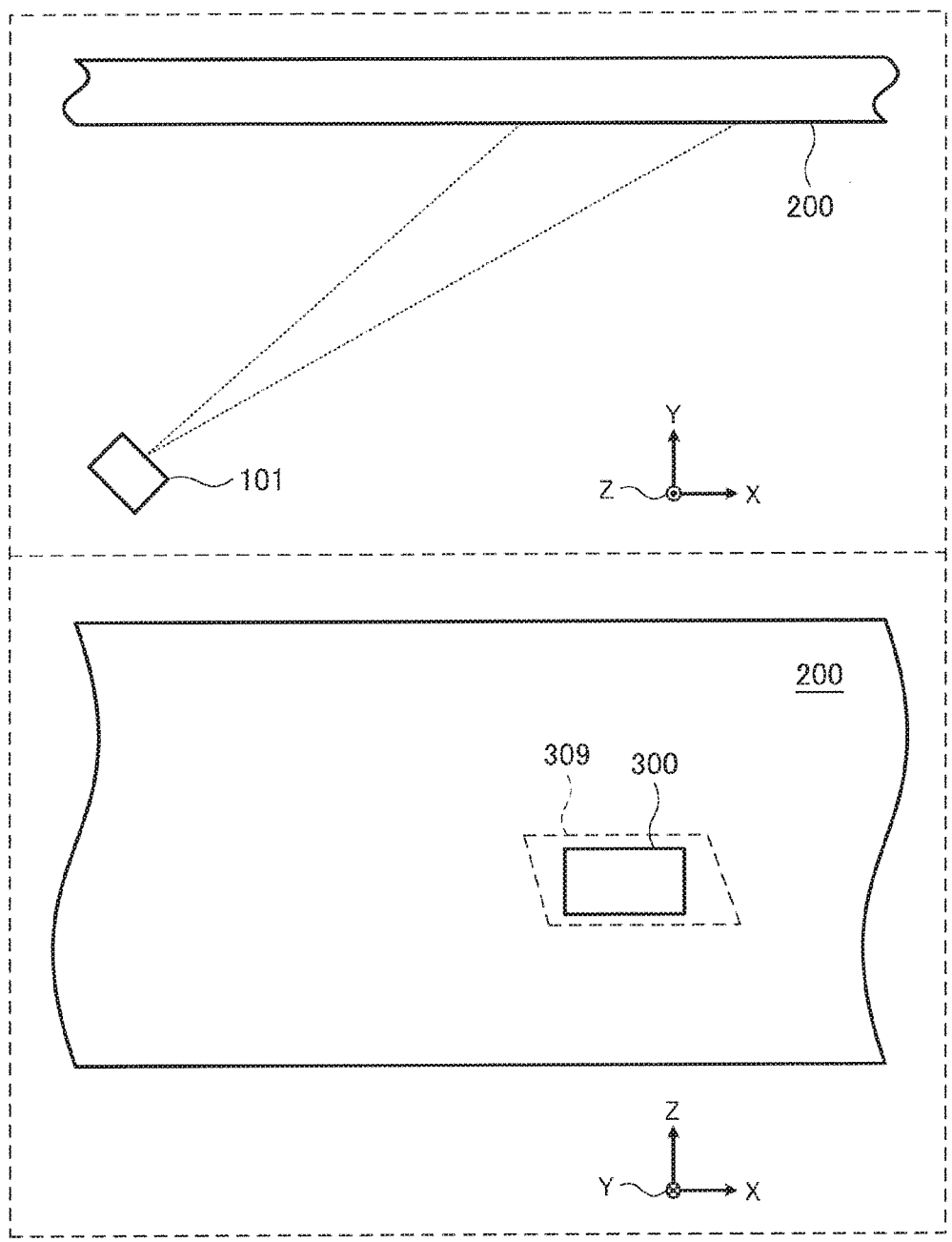
FIG. 8 illustrates a plan view and a side view of a projected image generated by using another optical system according to the embodiment.

Each of FIGS. 6 to 8 illustrates a plan view and a side view of a projected image.

Figure 9:
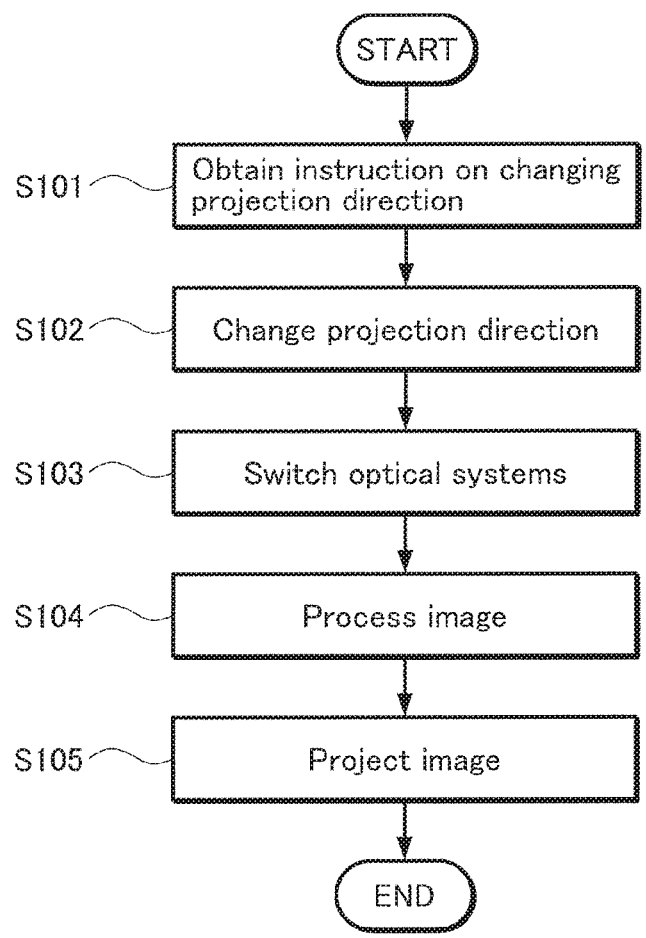
FIG. 9 is a flowchart of processing performed by the projector system according to the embodiment.

FIG. 9 is a flowchart of processing performed by the projector system.

As illustrated in FIG. 9, first, the change unit 121 obtains an instruction on changing a projection direction (S101). As described above, in some cases, such an instruction on changing a projection direction is given, for example, by the original image output unit 125, the image processing unit 123, or the like based on an aspect ratio of an image to be projected. It is also possible that an operator operates, during or before or after viewing an image content, an instruction device, such as a remote controller 120, to transmit a signal to change a normal arrangement to a horizontally-long arrangement, and the signal is obtained as the instruction on changing a projection direction.

Next, the change unit 121 causes the change mechanism 112 to change a projection direction according to the instruction (S102).

Next, the switch unit 122 causes the switch mechanism 114 to place a predetermined optical system 113 to be used for the projector 111 in conjunction with the changing of the projection direction which is caused by the change unit 121 (S103).

Next, the image processing unit 123 performs, for each of the projector units 101, image processing for causing the projected image 300 to be rectangular based on the target information indicating a projection direction of the projector 111, a selected optical system 113, and the like, and then transmits a resulting image to the projector 111 of each of the projector units 101 (S104).

The projector 111 projects an image onto the projection target 200 via the optical system 113 selected based on the received image (S105).

Here, as illustrated in FIG. 6, if an image is projected from the projector 111 onto the projection target 200 without using any optical system 113, distortion like the projection region 309 occurs. In this case, if a rectangular projected image 300 is to be displayed using the image processing, the number of effective pixels is significantly decreased and image quality is thereby deteriorated.

If the switch unit 122 causes the switch mechanism 114 to place a teleconverter (for example, 1.5× teleconverter) as an optical system 113 to be used for the projector 111, it is possible, as illustrated in FIG. 7, to decrease an amount of distortion and reduce the decrease in the number of effective pixels in the rectangular projected image 300 generated using the image processing.

Furthermore, if the switch unit 122 causes the switch mechanism 114 to set a distortion-correcting optical system as an optical system 113 to be used for the projector 111, it is possible, as illustrated in FIG. 8, to decrease an amount of distortion and obtain a rectangular projected image 300 even by using image processing which reduces the decrease in the number of effective pixels.

As described above, by selecting an optical system 113 appropriate for the projection direction or the projection target 200 and place the selected optical system 113 to be used for the projector 111, it is possible to project an image appropriate for the projection target 200.

The general and specific aspects according to the above-described embodiment may be implemented to a system, a device, an integrated circuit, a computer program, or a computer-readable recording medium, such as a Compact Disc-Read Only Memory (CD-ROM), or may be any combination of them.

[Other Embodiments]

Thus, the embodiment has been described as an example of the technique according to the present disclosure. However, the technique according to the present disclosure is not limited to the embodiment, and appropriate modifications, substitutions, additions, or eliminations, for example, may be made in the embodiment.

The following therefore describes examples of other embodiments.

For example, although the projector system 100 includes the four projector units 101 in the embodiment above, the number of the projector units 101 may be one. Even in this case, the optical systems 113 are selectively switched in conjunction with an operation of the projector 111. As a result, it is possible to reduce the decrease in the number of effective pixels and project a high-quality image onto the projection target 200.

Furthermore, if there are a plurality of the projector units 101, an arrangement of the projected images 300 is not limited to the matrix or the horizontally-long arrangement, but may be arbitrarily set to be a vertically-long arrangement, a tilted arrangement, and the like.

If the projector 111 is continuously operated from the situation where a projection direction of the projector 111 is perpendicular to a plane of the projection target 200, the switch unit 122 may perform the switching of the optical systems 113 based on a predetermined threshold (for example, the predetermined threshold is a half of the largest number of effective pixels, and the predetermined threshold is compared to the number of effective pixels resulted from image processing for projecting a rectangular projected image 300).

Moreover, in the above description, the image projected by each of the projector units 101 is described as a rectangle. However, the image projected by each of the projector units 101 is not limited to the example, and may be a distorted image that is not a perfect rectangle. In this case, each of the projector units 101 performs signal processing (the known edge blending technique) of adjusting an amount of light for parts in which adjacent images overlap each other on the projection region. As a result, the boundaries between adjacent images are hardly noticeable, and one image is thereby formed Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure can be used in a projector system including a single or a plurality of projector units 101. For example, the present disclosure can be applied to home theaters, conference systems, and the like.

The invention claimed is:

1. A projector system comprising:
a projector unit that projects light; and
a control device that controls the projector unit, wherein:
the projector unit includes:
a projector that projects the light;
a change mechanism that changes a projection direction of the projector;
an optical system group including a plurality of optical systems having different optical properties; and
a switch mechanism that selects an optical system from the optical system group and places the selected optical system at a position which the light projected from the projector passes through from a position which the light projected from the projection system does not pass and places a currently used optical system positioned at the position which the light projected from the projector passes through to the position which the light projected from the projection system does not pass, and
the control device includes:
a change unit configured to control the change mechanism; and
a switch unit configured to cause the switch mechanism to perform the placing of the selected optical system, from the optical system group, based on the projection direction of the projector after the changing of the projection direction of the projector which is caused by the change unit.

2. The projector system according to claim 1, wherein:
a plurality of projector units, each of which is the projector unit, are provided and include a first projector unit having a first change mechanism and a first switch mechanism and a second projector unit having a second change mechanism and a second switch mechanism,
the change unit is configured to cause the first change mechanism and the second change mechanism to selectively switch a positional relationship between (i) a first projected image that is an image projected by the first projector unit and (ii) a second projected image that is an image projected by the second projector unit, and
the switch unit is configured to cause at least one of the first switch mechanism and the second switch mechanism to perform the placing of the selected optical system, in conjunction with the selective switching of the positional relationship between the first projected image and the second projected image.

3. The projector system according to claim 1, further comprising
a target information holding unit configured to hold pieces of target information for a plurality of projection targets provided around the projector unit, the target information being information in which a state of distortion of the projection region caused when the projector unit projects light on a projection target is associated with each of the optical systems, wherein the switch unit is configured to, when the change unit causes the change mechanism to change the projection direction to be oriented towards a projection target among the projection targets, causes the switch mechanism to place the selected optical system at the position through which the light projected from the projector passes, based on one of the pieces of the target information which corresponds to the projection target.

4. The projector system according to claim 1, wherein the control device includes an image processing unit configured to perform image processing to obtain a rectangular image in the projection region based on the projection direction of the projector and the selected optical system.

5. The projector system according to claim 1, wherein the selected optical system is teleconverter.

6. The projector system according to claim 1, wherein the selected optical system is a distortion-correcting optical system.

\* \* \* \* \*